United States Patent
Makabe et al.

[11] Patent Number: 6,153,121
[45] Date of Patent: Nov. 28, 2000

[54] LIQUID-CRYSTALLINE RESIN COMPOSITION AND PRECISION MOLDINGS OF THE COMPOSITION

[75] Inventors: Yoshiki Makabe; Norio Kitajima, both of Nagoya; Toshihide Inoue, Ichinomiya, all of Japan

[73] Assignee: Toray Industries, Inc., Japan

[21] Appl. No.: 09/014,445

[22] Filed: Jan. 28, 1998

[30] Foreign Application Priority Data

Jan. 31, 1997 [JP] Japan .................................. 9-019301

[51] Int. Cl.[7] ............................ C09K 19/52; C09K 19/06
[52] U.S. Cl. .................................. 252/299.01; 252/299.6
[58] Field of Search ........................... 252/299.6, 299.01

[56] References Cited

U.S. PATENT DOCUMENTS

| | | | |
|---|---|---|---|
| 5,278,254 | 1/1994 | Furuta et al. | 525/397 |
| 5,498,689 | 3/1996 | Furuta et al. | 528/214 |
| 5,502,098 | 3/1996 | Watanabe et al. | 524/404 |
| 5,530,047 | 6/1996 | Watanabe et al. | 524/405 |
| 5,585,437 | 12/1996 | Ohmae et al. | 525/133 |
| 5,610,219 | 3/1997 | Takatani et al. | 524/413 |
| 5,624,984 | 4/1997 | Furuta et al. | 524/243 |
| 5,646,209 | 7/1997 | Furuta et al. | 524/252 |
| 5,767,195 | 6/1998 | Furuta et al. | 525/68 |
| 5,770,644 | 6/1998 | Yamamoto et al. | 524/120 |
| 5,783,620 | 7/1998 | Hamashima et al. | 524/405 |
| 5,820,780 | 10/1998 | Furuta et al. | 252/299.01 |

FOREIGN PATENT DOCUMENTS 0 449 059   10/1991   European Pat. Off. .
0 565 353   10/1993   European Pat. Off. .

*Primary Examiner*—C. H. Kelly
*Attorney, Agent, or Firm*—Austin R. Miller

[57] ABSTRACT

Disclosed are a liquid-crystalline resin composition comprising (A) from 20 to 99 parts by weight of a liquid-crystalline resin and (B) from 1 to 80 parts by weight of aluminium borate whiskers of which the grain size distribution as obtained through laser diffractometry is such that D90/D10 is from 7.5 to 20, and precision moldings of the composition.

20 Claims, No Drawings

LIQUID-CRYSTALLINE RESIN COMPOSITION AND PRECISION MOLDINGS OF THE COMPOSITION

FIELD OF THE INVENTION

The present invention relates to a liquid-crystalline resin composition with good fluidity enough to be formed into thin moldings and with good mechanical properties, which is useful in producing, for example, electric and electronic parts, OA and AV parts, car parts, machine parts and housing parts, and to precision moldings of the composition. In particular, it relates to a liquid-crystalline resin composition capable of being stably formed into damping precision moldings with good surface smoothness.

BACKGROUND OF THE INVENTION

Recently, there is increasing a great demand for high-tech plastics, and a variety of polymers with various novel functions have been being developed. Of those, liquid-crystalline resins which are characterized by the configuration of their molecular chains being in parallel with each other and which have optical anisotropy in melt are widely noticed, as having good fluidity and mechanical properties. However, such liquid-crystalline resins could not still be substituents, by themselves, for precision metal parts, since the mechanical properties of the resins alone are not so good. Therefore, it is necessary to develop liquid-crystalline resin compositions with good mechanical properties by adding some fillers with good mechanical properties to liquid-crystalline resins.

For example, known is a technique of adding aluminium borate whiskers, as a filler with good mechanical properties, to liquid-crystalline resins (see, for example, Japanese Patent Application Laid-Open Nos. 3-59067, 4-96965, 4-198256 and 6-220249). However, the known aluminium borate whiskers are problematic in that, when resin compositions comprising them are formed into precision moldings such as optical pickup parts, the precision moldings could not have intended good mechanical properties and could not be good damping parts, and, in addition, the precision moldings often have different mechanical properties and many failed products with poor mechanical properties are produced.

SUMMARY OF THE INVENTION

The present invention is to solve those problems, and its object is to provide a liquid-crystalline resin composition with good fluidity enough to be formed into thin moldings and with good mechanical properties, and to provide precision moldings of the composition. The precision moldings of the composition have good mechanical properties and good dampability, and their surface is smooth. The composition of the invention can be molded into precision moldings with such good properties with little exception.

In order to attain the object, we, the present inventors have assiduously studied and have completed the present invention, which is as follows:

(1) A liquid-crystalline resin composition comprising (A) 100 parts by weight of a liquid-crystalline resin and (B) from 1 to 300 parts by weight of aluminium borate whiskers of which the grain size distribution as obtained through laser diffractometry satisfies the following requirement:

$7.5 \leq D90/D10 \leq 20$ wherein D90 (μm) indicates the grain size at a relative grain content of 90%, and D10 (μm) indicates the grain size at a relative grain content of 10%.

(2) A liquid-crystalline resin composition comprising (A) 100 parts by weight of a liquid-crystalline resin and (B) from 1 to 300 parts by weight of aluminium borate whiskers, in which the grain size distribution as obtained through laser diffractometry of the aluminium borate whiskers existing therein satisfies the following requirement:

$5 \leq D90/D10 \leq 20$ wherein D90 (μm) indicates the grain size at a relative grain content of 90%, and D10 (μm) indicates the grain size at a relative grain content of 10%.

(3) The liquid-crystalline resin composition of (1) or (2), in which the liquid-crystalline resin (A) comprises any of liquid-crystalline polyesters and/or liquid-crystalline polyesteramides.

(4) The liquid-crystalline resin composition of any one of (1) to (3), in which the liquid-crystalline resin (A) comprises any of liquid-crystalline polyesters and/or liquid-crystalline polyesteramides indispensably having ethylene dioxide units.

(5) The liquid-crystalline resin composition of any one of (1) to (4), in which the liquid-crystalline resin (A) is a liquid-crystalline polyester comprising the following constitutional units (I), (II), (III) and (IV):

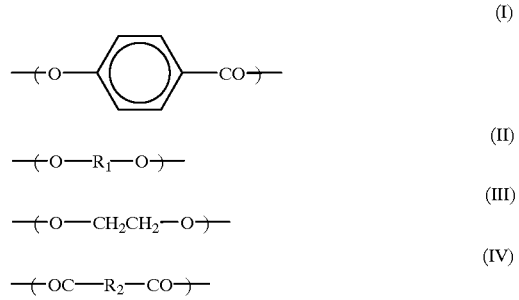

wherein $R_1$ represents at least one group selected from

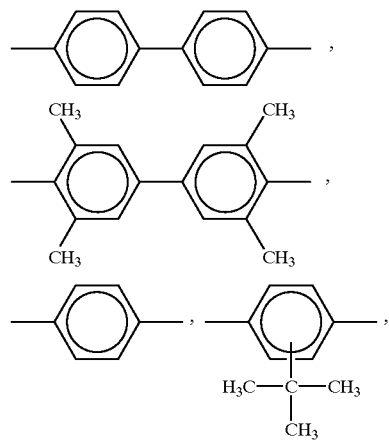

-continued

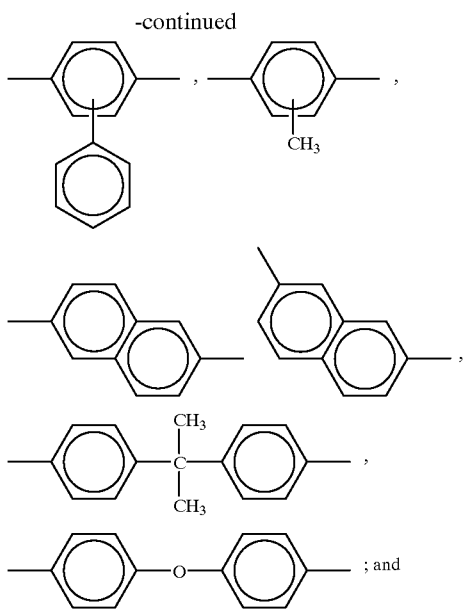

$R_2$ represents at least one group selected from

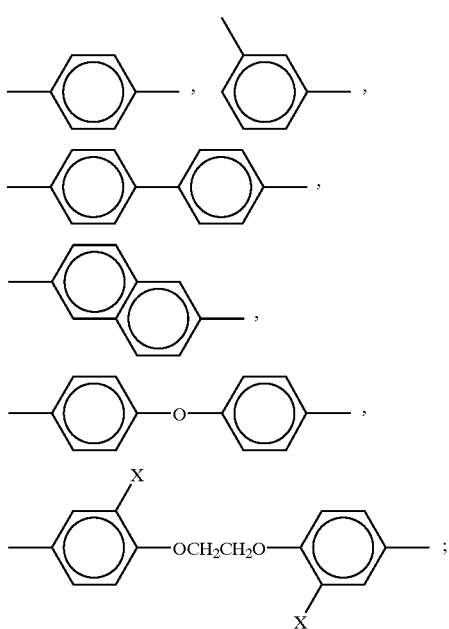

in which X represents a hydrogen atom or a chlorine atom.

(6) The liquid-crystalline resin composition of any one of (1), and (3) to (5), in which the grain size distribution of the aluminium borate whiskers (B) as obtained through laser diffractometry satisfies the following requirement:

$8 \leq D90/D10 \leq 14.$ (7) The liquid-crystalline resin composition of any one of (1), and (3) to (6), in which the grain size distribution of the aluminium borate whiskers (B) as obtained through laser diffractometry satisfies the following requirement:

$1.0 \mu m \leq D10 \leq 2.0 \mu m.$ (8) The liquid-crystalline resin composition of any one of (1), and (3) to (7), in which the grain size distribution of the aluminium borate whiskers (B) as obtained through laser diffractometry satisfies the following requirement:

$8.0 \mu m \leq D90 \leq 18 \mu m.$ (9) The liquid-crystalline resin composition of any one of (1) to (8), which additionally contains from 0.5 to 60 parts by weight of an organic bromine compound relative to 100 parts by weight of the liquid-crystalline resin (A).

(10) The liquid-crystalline resin composition of (9), in which the organic bromine compound is a polystyrene bromide as produced from a styrene bromide monomer to consist essentially of one or more of the following constitutional units and have a weight-average molecular weight of from $1 \times 10^3$ to $120 \times 10^4$.

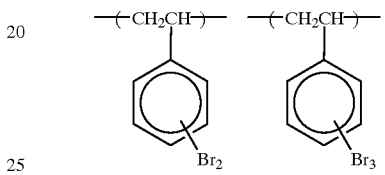

(11) The liquid-crystalline resin composition of any one of (1) to (10), which additionally contains from 0.01 to 10 parts by weight of one or more olefinic polymers selected from polyethylene, polypropylene, copolymers of ethylene or propylene with u-olefins having 3 or more carbon atoms, and copolymers of ethylene or propylene with (-olefins having 3 or more carbon atoms and non-conjugated dienes, relative to 100 parts by weight of the liquid-crystalline resin (A).

(12) A method for producing the liquid-crystalline resin composition of any one of (1) to (11), which comprises adding, to a melt of a liquid-crystalline resin (A), aluminium borate whiskers (B) of which the grain size distribution as obtained through laser diffractometry satisfies the following requirement:

$7.5 \leq D90/D10 \leq 20$ wherein D90 ($\mu$m) indicates the grain size at a relative grain content of 90%, and D10 ($\mu$m) indicates the grain size at a relative grain content of 10%.

(13) A molding of a liquid-crystalline resin composition comprising (A) 100 parts by weight of a liquid-crystalline resin and (B) from 1 to 300 parts by weight of aluminium borate whiskers, in which the grain size distribution as obtained through laser diffractometry of the aluminium borate whiskers existing therein satisfies the following requirement:

$5 \leq D90/D10 \leq 20$ wherein D90 ($\mu$m) indicates the grain size at a relative grain content of 90%, and D10 ($\mu$m) indicates the grain size at a relative grain content of 10%.

(14) A precision molding as produced by molding the liquid-crystalline resin composition of any one of (1) to (11).

(15) The molding of (13), which is a precision molding.

(16) The precision molding of (14) or (15), which is for damping parts.

(17) An optical pickup part as produced by molding the liquid-crystalline resin composition of any one of (1) to (11).

DESCRIPTION OF PREFERRED EMBODIMENTS OF THE INVENTION

The liquid-crystalline resin (A) for use in the invention is anisotropic in melt, including, for example, liquid-crystalline polyesters, liquid-crystalline polyesteramides, liquid-crystalline polyester carbonates, and liquid-crystalline polyester elastomers. Of those, preferred are liquid-crystalline polyesters and liquid-crystalline polyesteramides.

The liquid-crystalline polyesters comprise one or more constitutional units selected from aromatic oxycarbonyl units, aromatic dioxy units, aromatic dicarbonyl units and ethylene-dioxy units, and form an anisotropic phase in melt. The liquid-crystalline polyesteramides comprises one or more constitutional units selected from those in said liquid-crystalline polyesters and one or more constitutional units selected from aromatic iminocarbonyl units, aromatic diimino units and aromatic iminoxy units, and form an anisotropic phase in melt.

Preferably, the liquid-crystalline polyesters for use in the invention indispensably comprise ethylene-dioxy units, more preferably comprise the following constitutional units (I), (III) and (IV), or the units (I), (II), (III) and (IV), most preferably comprise the units (I), (II), (III) and (IV).

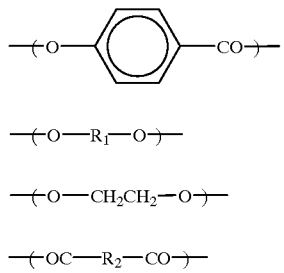

wherein $R_1$ represents at least one group selected from

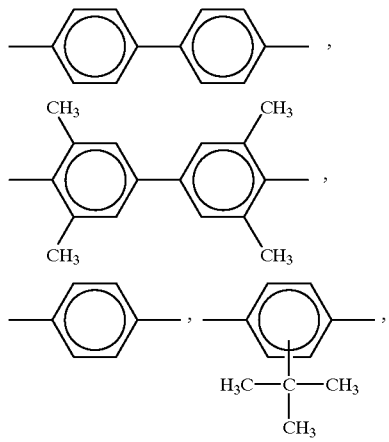

-continued

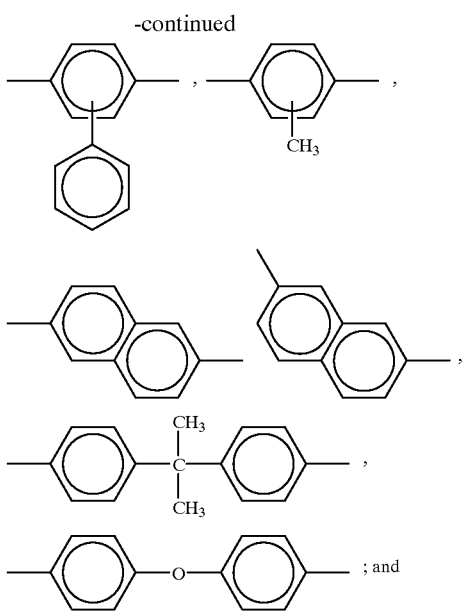

$R_2$ represents at least one group selected from

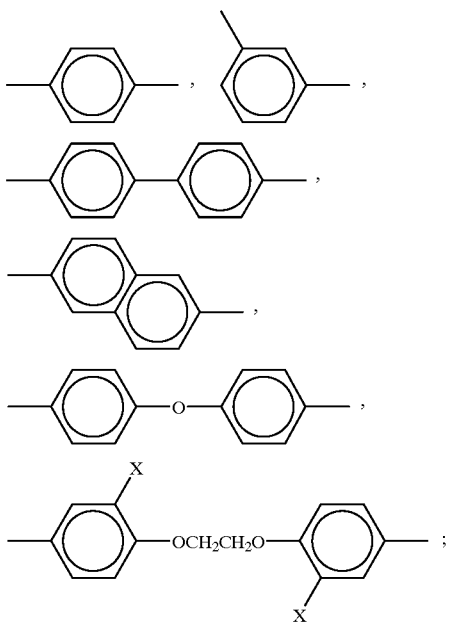

in which X represents a hydrogen atom or a chlorine atom.

In those, preferably, the ratio of the constitutional units (IV) to the sum of the constitutional units (II) and (III) is a substantially equimolar one.

The constitutional unit (I) is derived from p-hydroxybenzoic acid; the constitutional unit (II) is from at least one or more aromatic dihydroxy compounds selected from 4,4'-dihydroxybiphenyl, 3,3',5,5'-tetramethyl-4,4'-dihydroxybiphenyl, hydroquinone, t-butylhydroquinone, phenylhydroquinone, methylhydroquinone, 2,6-dihydroxynaphthalene, 2,7-dihydroxynaphthalene, 2,2-bis (4-hydroxyphenyl)propane, and 4,4'-dihydroxydiphenyl ether; the constitutional unit (III) is from ethylene glycol; and the constitutional unit (IV) is from one or more aromatic dicarboxylic acids selected from terephthalic acid, isophthalic acid, 4,4'-diphenyldicarboxylic acid, 2,6-naphthalenedicarboxylic acid, 1,2-bis(phenoxy)ethane-4,4'-dicarboxylic acid, 1,2-bis(2-chlorophenoxy)ethane-4,4'-dicarboxylic acid, and 4,4'-diphenyl ether-dicarboxylic acid.

Of these units, especially preferred are those in which $R_1$ is

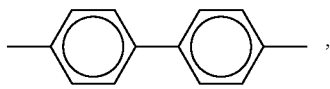

and $R_2$ is

The preferred liquid-crystalline polyesters for use in the present invention are copolymers comprising those constitutional units (I), (III) and (IV), or comprising (I), (III), (III) and (IV). In the polyesters, the copolymerizing ratio to give the units (I), (II), (III) and (IV) is not specifically defined but may be any desired one. In view of the fluidity of the polyesters, however, the copolymerizing ratio is preferably as follows:

In the copolymers comprising the constitutional units (I), (III) and (IV), the ratio of the constitutional units (I) to the sum of the constitutional units (I) and (III) is preferably from 30 to 95 mol %, more preferably from 40 to 95 mol %. In those, preferably, the ratio of the constitutional units (IV) to the constitutional units (III) is a substantially equimolar one.

In the copolymers comprising the constitutional units (I), (II), (III) and (IV), the ratio of the sum of the constitutional units (I) and (II) to the sum of the constitutional units (I), (II) and (III) is preferably from 60 to 95 mol %, more preferably from 80 to 92 mol %, in view of the heat resistance, the flame retardancy and the mechanical properties of the copolymers. In those, the ratio of the constitutional units (III) to the sum of the constitutional units (I), (II) and (III) is preferably from 5 to 40 mol %, more preferably from 8 to 20 mol %. In those, the molar ratio of the constitutional units (I) to (II), (I)/(II), is preferably from 75/25 to 95/5, more preferably from 78/22 to 93/7, in view of the balance between the heat resistance and the fluidity of the copolymers. Also in those, preferably, the ratio of the constitutional units (IV) to the sum of the constitutional units (II) and (III) is a substantially equimolar one.

As the liquid-crystalline polyesteramides for use in the invention, preferred are those comprising the constitutional units (I) to (IV) and p-iminophenoxy units derived from p-aminophenol and capable of forming an anisotropic phase in melt.

Apart from the constitutional units (I) to (IV) constituting them, the preferred liquid-crystalline polyesters and liquid-crystalline polyesteramides for use in the invention may be additionally copolymerized with any other comonomers of, for example, aromatic dicarboxylic acids such as 3,3'-diphenyldicarboxylic acid, 2,2'-diphenyldicarboxylic acid; aliphatic dicarboxylic acids such as adipic acid, azelaic acid, sebacic acid, dodecane-dioic acid; alicyclic dicarboxylic acids such as hexahydroterephthalic acid; aromatic diols such as chlorohydroquinone, 3,4'-dihydroxybiphenyl, 4,4'-dihydroxydiphenylsulfone, 4,4'-dihydroxydiphenylsulfide, 4,4'-dihydroxybenzophenone, 3,4'-dihydroxybiphenyl; aliphatic and alicyclic diols such as 1,4-butane-diol, 1,6-hexane-diol, neopentyl glycol, 1,4-cyclohexane-diol, 1,4-cyclohexane-dimethanol; aromatic hydroxycarboxylic acids such as m-hydroxybenzoic acid, 2,6-hydroxynaphthoic acid; p-aminophenol, p-aminobenzoic acid, etc., so far as the additional comonomers do not interfere with the liquid crystallinity of the copolymers.

Methods for producing the liquid-crystalline resins for use in the invention are not specifically defined. For example, the liquid-crystalline polyesters and the liquid-crystalline polyesteramides for use in the invention can be produced in accordance with any conventional polycondensation for producing ordinary polyesters or polyesteramides.

Hereinunder mentioned are some preferred methods for producing the preferred liquid-crystalline polyesters for use in the invention.

(1) A method of producing polyesters through deacetylating polycondensation of p-acetoxybenzoic acid, a diacylated aromatic dihydroxy compound such as 4,4'-diacetoxybiphenyl or diacetoxybenzene, an aromatic dicarboxylic acid such as terephthalic acid, and a polymer or oligomer of a polyester such as polyethylene terephthalate or a bis($\beta$-hydroxyethyl) ester of an aromatic dicarboxylic acid such as bis($\beta$-hydroxyethyl) terephthalate.

(2) A method of producing polyesters through deacetylating polycondensation of p-hydroxybenzoic acid, an aromatic dihydroxy compound such as 4,4'-dihydroxybiphenyl or hydroquinone, acetic anhydride, an aromatic dicarboxylic acid such as terephthalic acid, and a polymer or oligomer of a polyester such as polyethylene terephthalate or a bis($\beta$-hydroxyethyl) ester of an aromatic dicarboxylic acid such as bis($\beta$-hydroxyethyl) terephthalate.

(3) A modification of the method (1) or (2) in which is additionally used 1,2-bis(4-hydroxybenzoyl)ethane, as in Japanese Patent Application Laid-Open No. 3-59024.

As the catalyst for the polycondensation, used is any and every known one that is generally used for polycondensation to give liquid-crystalline resins.

Of some liquid-crystalline resins usable in the invention, the logarithmic viscosity number can be measured in pentafluorophenol. Preferably, their logarithmic viscosity is not smaller than 0.3, when measured at a concentration of 0.1 g/dl at 60° C. Especially preferably, of the resins having the constitutional units (III), the logarithmic viscosity falls between 0.5 and 3.0 dl/g; and of those not having the constitutional units (III), the logarithmic viscosity falls between 1.0 and 15.0 dl/g.

The melt viscosity of the liquid-crystalline resins for use in the invention falls preferably between 10 and 20,000 ps, more preferably between 20 and 10,000 ps.

The aluminium borate whiskers (B) for use in the invention are needle-like ones having a chemical composition of $9Al_2O_3 \cdot 2B_2O_3$ or $2Al_2O_3 \cdot B_2O_3$. Those aluminium borate whiskers can be produced, for example, by heating $Al_2O_3$ or a material capable of giving $Al_2O_3$ together with $B_2O_3$ or a material capable of giving $B_2O$, at a temperature falling between 800 and 1200° C., in the presence of an alkali metal salt, followed by growing the whiskers formed.

The aluminium borate whiskers (B) for use in the invention may be pre-treated at their surface with coupling agents such as silane compounds, titanate compounds and aluminium compounds. The silane compounds include, for example, aminosilane, epoxysilane, vinylsilane and mercaptosilane. As specific examples of the coupling agent usable herein, mentioned are γ-aminopropyltriethoxysilane, γ-(2-aminoethyl)aminopropyltrimethoxysilane, γ-glycidoxypropyltrimethoxysilane, γ-mercaptopropyltrimethoxysilane, methyltrimethoxysilane, γ-anilinopropyltrimethoxysilane, hydroxypropyltrimethoxysilane, γ-ureidopropyltriethoxysilane, vinylacetoxysilane, isopropyl-tris-isostearoyl titanate, isopropyl-tris(dioctyl pyrophosphato)titanate, isopropyl-tri(n-aminoethyl-aminoethyl) titanate, tetraoctyl-bis(ditridecyl phosphito) titanate, bis(dioctyl pyrophosphato)ethylene titanate, isopropyl-tridecyl benzenesulfonyltitanate, isopropyl-tri(dioctyl phosphato)titanate, and acetoalkoxyaluminium diisproylate.

The aluminium borate whiskers (B) for use in the invention are such that their grain size distribution as obtained through laser diffractometry satisfies the following requirement:

$$7.5 \leq D90/D10 \leq 20$$

preferably, $$8 \leq D90/D10 \leq 14$$

wherein D90 ($\mu$m) indicates the grain size at a relative grain content of 90%, and D10 ($\mu$m) indicates the grain size at a relative grain content of 10%.

Having the value, D90/D10 falling within the defined range, the whiskers (B) have high mechanical strength and good surface smoothness. The physical properties of the resin composition comprising the whiskers (B) that satisfy the requirement are stable and fluctuate little, and the properties of the moldings of the composition are also stable and fluctuate little.

More preferably, the grain size distribution of the aluminium borate whiskers (B) as obtained through laser diffractometry satisfies the requirement of 1.0 $\mu$m<D10$\leq$2.0 $\mu$m, since the moldings of the composition containing those whiskers have a high modulus of elasticity, good damping ability and good surface smoothness.

Also preferably, the grain size distribution of the aluminium borate whiskers (B) as obtained through laser diffractometry satisfies the requirement of 8.0 $\mu$m<D90$\leq$18 $\mu$m, since the moldings of the composition containing those whiskers have high mechanical strength and good surface smoothness, and since those properties of the moldings are stable and fluctuate little.

The grain size distribution of the aluminium borate whiskers (B) for use in the invention can be obtained, using any ordinary, laser-diffractometric grain size analyzer. As the grain size analyzer, known are wet-type and dry-type ones, any of which is employable herein. For the wet-type analyzer, water may be used as the dispersion medium for the aluminium borate whiskers to be analyzed therewith. The whiskers may be pre-treated at their surfaces with alcohol or neutral detergent. A phosphate such as sodium hexametaphosphate or sodium pyrophosphate may be used as the dispersant. An ultrasonic bath may be used as the dispersing device. Preferably, the determination of the grain size distribution of the whiskers, which often depends on the capacity of the analyzer used, covers the range between 0.1 $\mu$m as the smallest value and 500 $\mu$m as the largest value. More preferably, it covers the range between 0.05 $\mu$m and 700 $\mu$m. From the cumulative grain size distribution data as analyzed with the laser-diffractometric grain size analyzer, obtained are the grain size, D10 ($\mu$m) at a relative grain content of 10% based on the smallest grain size, and the grain size, D90 ($\mu$m) at a relative grain content of 90% based on the same.

The amount of the aluminium borate whiskers (B) to be in the composition of the invention is from 1 to 300 parts by weight, preferably from 10 to 200 parts by weight, more preferably from 25 to 100 parts by weight, relative to 100 parts by weight of the liquid-crystalline resin (A) constituting the composition.

If desired, any other fillers may be added to the liquid-crystalline resin composition of the invention. The additional fillers include, for example, glass fibers, carbon fibers, aromatic polyamide fibers, potassium titanate fibers, gypsum fibers, brass fibers, stainless fibers, steel fibers, ceramic fibers, boron whisker fibers, asbestos fibers; and various fibrous, powdery, granular or tabular inorganic fillers of, for example, graphite, mica, talc, silica, calcium carbonate, glass beads, glass flakes, glass microballoons, clay, wollastonite, titanium oxide and molybdenum disulfide. These fillers may be pre-treated at their surfaces with coupling agents such as silane compounds, titanate compounds and others, or with any other surface-treating agents.

The liquid-crystalline resin composition of the invention may additionally contain, if desired, an organic bromine compound. Flame-retardant, organic bromine compounds are known, any of which is employable herein. Preferred are those having a bromine content of not smaller than 20% by weight. As specific examples of the organic bromine compounds usable in the invention, mentioned are low-molecular-weight organic bromine compounds such as hexabromobenzene, pentabromotoluene, hexabromobiphenyl, decabromobiphenyl, hexabromocyclodecane, decabromodiphenyl ether, octabromodiphenyl ether, hexabromodiphenyl ether, bis(pentabromophenoxy)ethane, ethylene-bis(tetrabromophthalimide), tetrabromobisphenol A; and halogenated polymers and oligomers such as polycarbonate bromides (e.g., polycarbonate oligomers produced from bisphenol A bromide, or their copolymers with bisphenol A), epoxy bromide compounds (e.g., diepoxy compounds produced through reaction of bisphenol A bromide and epichlorohydrin, and monoepoxy compounds produced through reaction of bromophenols and epichlorohydrin), poly(bromobenzyl acrylates), polyphenylene ether bromides, bisphenol A bromides, condensates of cyanuric chloride and bromophenol, polystyrene bromides, crosslinked polystyrene bromides, crosslinked poly-α-methylstyrene bromides; and their mixtures. Of those, preferred are ethylene-bis(tetrabromophthalimide), epoxy bromide oligomers and polymers, polystyrene bromides, crosslinked polystyrene bromides, polyphenylene ether bromides, and polycarbonate bromides. Most preferred are polystyrene bromides.

The preferred organic bromine compounds are described in more detail hereinunder. Of epoxy bromide polymers, especially preferred are those represented by the following general formula (i):

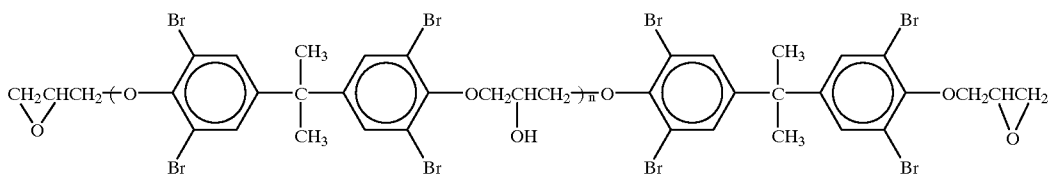

(i)

In formula (i), n indicates the degree of polymerization, and is preferably not smaller than 15, more preferably from 50 to 80.

The polystyrene bromides usable in the invention include, for example, polystyrene bromides and crosslinked polystyrene bromides to be prepared by brominating polystyrene as obtained through radical polymerization or anionic polymerization of styrene; and polystyrene bromides as obtained through radical polymerization or anionic polymerization, but preferably through radical polymerization of styrene bromide monomers, and having styrene bromide units of the following formulae (ii) and/or (iii). Especially preferred are polystyrene bromides as produced from styrene bromide monomers to have, as the essential constitutional component, the constitutional units of the following formulae (ii) and/or (iii) and have a weight-average molecular weight of from $1 \times 10^3$ to $120 \times 10^4$.

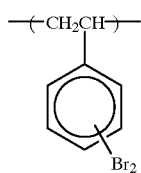

(ii)

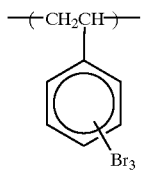

(iii)

The styrene bromide monomers to be used herein are preferably those having 2 or 3 bromine atoms in one molecule as introduced into the aromatic ring of the molecule through substitution. In addition to such dibromostyrene and/or tribromostyrene, also usable is monobromostyrene.

The polystyrene bromides for use in the invention preferably have dibromostyrene and/or tribromostyrene units in an amount of not smaller than 60% by weight, more preferably not smaller than 70% by weight. They may have monobromostyrene units in an amount of not larger than 40% by weight, preferably not larger than 30% by weight, in addition to those dibromostyrene and/or tribromostyrene units. More preferably, the polystyrene bromides have a weight-average molecular weight of from $1 \times 10^4$ to $15 \times 10^4$. The weight-average molecular weight as referred to herein is obtained through gel permeation chromatography, and is a relative value based on the molecular weight of polystyrene.

As the crosslinked polystyrene bromides, preferred are those to be prepared by brominating porous polystyrene as crosslinked with divinylbenzene.

As the polycarbonate bromides, preferred are those of the following general formula (iv):

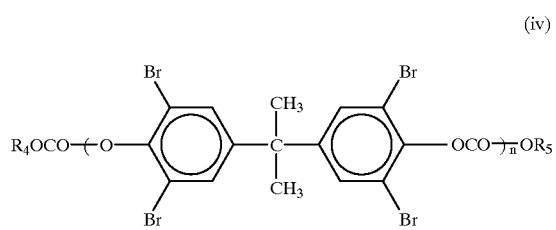

(iv)

wherein $R_4$ and $R_5$ each represent a substituted or unsubstituted aryl group, and are most preferably a p-t-butylphenyl group.

In formula (iv), n indicates the degree of polymerization, and is preferably 4 or more, more preferably 8 or more, even more preferably between 8 and 25.

The amount of the organic bromine compound, if any, in the liquid-crystalline resin composition of the composition may be from 0.5 to 60 parts by weight, preferably from 1 to 30 parts by weight, relative to 100 parts by weight of the liquid-crystalline resin (A) in the composition.

Preferably, the organic bromine compound is dispersed in the composition to have a mean grain size of not larger than 2.5 μm, more preferably not larger than 2.0 μm.

The composition of the invention may further contain, if desired, an olefinic polymer. The olefinic polymer is not specifically defined, but is preferably selected from polyethylene, polypropylene, copolymers of ethylene and/or propylene with α-olefins having 4 or more carbon atoms, and copolymers of ethylene and/or propylene with α-olefins having 4 or more carbon atoms and non-conjugated dienes. One or more of those olefinic polymers may be used herein either singly or as combined.

As the α-olefins having 4 or more carbon atoms, for example, preferred are butene-1, pentene-1, 3-methylpentene-1 and octene-1, and more preferred is butene-1. Two or more of those α-olefins may be used herein as combined.

As the non-conjugated dienes, for example, preferred are 5-ethylidene-2-norbornene, dicyclopentadiene, and 1,4-hexadiene.

In the copolymers of ethylene with α-olefins having 3 or more carbon atoms, the copolymerizing ratio of ethylene to α-olefins having 3 or more carbon atoms is preferably from 40/60 to 99/1 (by mol), more preferably from 70/30 to 95/5 (by mol).

In the copolymers of ethylene with α-olefins having 3 or more carbon atoms and non-conjugated dienes, the copolymerizing amount of ethylene is preferably from 5 to 96.9 mol %, more preferably from 30 to 84.5 mol %, that of α-olefins having 3 or more carbon atoms is preferably from 3 to 80 mol %, more preferably from 15 to 60 mol %, and that of non-conjugated dienes is preferably from 0.1 to 15 mol %, more preferably from 0.5 to 10 mol %. In the copolymers of propylene with α-olefins having 4 or more carbon atoms and non-conjugated dienes, the copolymerizing amount of propylene is preferably from 5 to 96.9 mol %, more preferably from 30 to 84.5 mol %, that of α-olefins having 4 or more carbon atoms is preferably from 3 to 80 mol %, more preferably from 15 to 60 mol %, and that of non-conjugated dienes is preferably from 0.1 to 15 mol %, more preferably from 0.5 to 10 mol %.

As specific examples of those copolymers, mentioned are ethylene/propylene copolymer, ethylene/butene-1 copolymer, ethylene/pentene-1 copolymer, ethylene/propylene/butene-1 copolymer, propylene/pentene-1 copolymer, propylene/butene-1 copolymer, ethylene/propylene/5-ethylidene-2-norbornene copolymer, ethylene/propylene/1,4-hexadiene copolymer, propylene/butene-1/1,4-hexadiene copolymer, and ethylene/propylene/dicyclopentadiene copolymer. Of those, preferred are ethylene/propylene copolymer and ethylene/butene-e copolymer because of their good heat resistance.

Two or more of those olefinic polymers may be used herein as combined.

Preferably, the olefinic polymers do not have any comonomers having epoxy group, carboxylic acid group and the like, since the composition containing the olefinic polymer has good fluidity.

Though not specifically defined, the weight-average molecular weight of the olefinic polymer is preferably from 10,000 to 600,000, more preferably from 30,000 to 500,000, even more preferably from 100,000 to 450,000, in view of the mold releasability, the welding strength and the outward appearance of the moldings of the composition containing the polymer and of the fluidity of the composition.

Also though not specifically defined, the amount of the olefinic polymer, if any, in the composition is preferably from 0.01 to 10 parts by weight, more preferably from 0.1 to 5 parts by weight, relative to 100 parts by weight of the liquid-crystalline resin (A) constituting the composition, in view of the mold releasability and the welding strength of the moldings of the composition.

In order to further improve the physical properties of the liquid-crystalline resin composition of the invention, an epoxy compound may be added to the composition. The structure of the epoxy compound to be added is not specifically defined. Preferably, however, the epoxy compound has two or more epoxy groups, most preferably two epoxy groups. The epoxy compound includes, for example, glycidyl ethers, glycidyl ester-ethers, glycidyl esters, epoxidated imide compounds, epoxy-containing copolymers, and epoxysilanes. Not only one but also two or more of those epoxy compounds may be used herein either singly or as combined.

If further desired, any ordinary additives may optionally be added to the liquid-crystalline resin composition of the invention without interfering with the object of the invention, thereby making the composition have predetermined properties. The additives include, for example, antioxidants and thermal stabilizers (e.g., hindered phenols, hydroquinones, phosphites and their substituted derivatives), ultraviolet absorbents (e.g., resorcinols, salicylates, benzotriazoles, benzophenones), lubricants and mold releasing agents (e.g., montanic acid and its salts, esters and half esters, stearyl alcohol, stearamide, polyethylene, polyethylene wax), colorants containing dye (e.g., nitrosin) and pigment (e.g., cadmium sulfide, phthalocyanine, carbon black), plasticizers, antistatic agents, nucleating agents, and flame retardants.

Methods for producing the liquid-crystalline resin composition of the invention are not specifically defined. One example is to knead the constituent components in melt.

Preferably, a liquid-crystalline resin (A) is kneaded in melt with aluminium borate whiskers (B) along with a filler. The melt-kneading may be attained in any known manner. For example, for this, employable is any of Bumbury mixers, rubber rollers, kneaders, and single-screw or double-screw extruders. Through the melt-kneading of those components, obtained is the intended composition.

In one preferred method, aluminium borate whiskers (B) are added to and mixed with a melt of a liquid-crystalline resin (A). In this, concretely, a liquid-crystalline resin (A) is previously put into a double-screw extruder and melted therein, into which are fed aluminium borate whiskers (B) through a side feeder and kneaded with the melt of the resin (A) therein. Desirably, the screws of the extruder are so arranged that the aluminium borate whiskers (B) as fed into the extruder through the side feeder are not so much kneaded with the melt of the resin in order to break the whiskers as little as possible.

Methods of adding the other additives to the composition are not also specifically defined. Preferably, however, the additives are kneaded in melt with the composition. The melt-kneading may be attained in any known manner. Concretely, for example, employable is a method of previously adding the additives to the liquid-crystalline resin in the preferred manner mentioned above, or a method of adding the additives to the melt of the resin along with the component (B) or separately from it in any desired zone.

It is desirable that the grain size distribution of the aluminium borate whiskers (B) in the liquid-crystalline resin composition of the invention satisfies the requirement of:

$$5 \leq D90/D10 \leq 20,$$

since the moldings of the composition have high mechanical strength and good surface smoothness and since the physical properties of the moldings are stable and fluctuate little.

One preferred method for producing the liquid-crystalline resin composition in which the component (B) satisfies the defined grain size distribution comprises previously putting a liquid-crystalline resin (A) into a double-screw extruder, melting it therein, then feeding thereinto the aluminium borate whiskers (B) having the defined grain size distribution through a side feeder, and kneading them in the extruder. Desirably, the screws of the extruder are so arranged that the aluminium borate whiskers (B) as fed into the extruder through the side feeder are not so much kneaded with the melt of the resin in order to break the whiskers as little as possible.

Methods of adding the other additives to the composition are not also specifically defined. Preferably, however, the additives are kneaded in melt with the composition. The melt-kneading may be attained in any known manner. Concretely, for example, employable is a method of previously adding the additives to the liquid-crystalline resin in the preferred manner mentioned above, or a method of adding the additives to the melt of the resin along with the component (B) or separately from it in any desired zone.

The liquid-crystalline resin composition of the invention has good moldability, and can be molded in any ordinary molding mode (e.g., injection molding, extrusion molding, blow molding, compression molding, injection compression molding) to give three-dimensional moldings, sheets, containers, pipes, etc. Especially preferably, the composition is molded through injection molding to give precision moldings.

It is desirable that the grain size distribution of the aluminium borate whiskers (B) in the moldings of the liquid-crystalline resin composition of the invention satisfies the requirement of:

$$5 \leq D90/D10 \leq 20,$$

since the moldings have high mechanical strength and good surface smoothness and since the physical properties of the moldings are stable and fluctuate little.

One preferred method for producing the moldings comprises molding a liquid-crystalline resin composition as prepared by kneading a liquid-crystalline resin (A) in melt with aluminium borate whiskers (B) having a specific grain size distribution. Especially preferably, in this, molded is a liquid-crystalline resin composition where the aluminium borate whiskers existing have the specifically defined grain size distribution. For the molding, employable is any mode of injection molding, extrusion molding, blow molding, compression molding or injection compression molding. Especially preferred is injection molding. The precision moldings of the composition as produced through injection molding are especially good.

The liquid-crystalline resin composition of the invention has various applications. For example, it is used for producing various electric and electronic parts, such as typically gears, cases, sensors, LED lamps, connectors, sockets, resistors, relay case switch coil bobbins, capacitors, variable condenser cases, optical pickups, oscillators, terminal plates, transformers, plugs, printed circuit boards, tuners, speakers, microphones, headphones, small-sized motors, magnetic head bases, power modules, housings, semiconductors, liquid-crystal display devices, FDD carriages, FDD chassis, HDD parts, motor brush holders, parabola antennas, computer-related parts, etc.; parts of electric appliances for home and office use, such as typically VTR parts, TV parts, irons, hair driers, rice cooker parts, microwave range parts, acoustic parts, sound parts (e.g., audios, laser discs, compact discs), lighting parts, refrigerator parts, air-conditioner parts, typewriter parts, word-processor parts, etc.; machine-related parts, such as typically office computer-related parts, telephone communication-related parts, facsimile-related parts, duplicator-related parts, washing tools, various bearings (e.g., oil-less bearings, stern bearings, underwater bearings), motor parts, lighters, typewriters, etc.; optical or precision appliance-related parts, such as typically microscopes, binoculars, cameras, watches, etc.; car and train-related parts, such as typically oil terminator terminals, oil terminator connectors, IC regulators, various valves (e.g., exhaust gas valves), fuel pipes, exhaust gas pipes, air intake pipes, air intake nozzle snorkels, intake manifolds, fuel pumps, engine-cooling water joints, carburetor main bodies, carburetor spacers, exhaust gas sensors, cooling water sensors, oil temperature sensors, brake friction pad wear sensors, throttle position sensors, crankshaft position sensors, air flow meters, thermostat bases for air conditioners, hot air flow control valves, brush holders for radiator motors, water pump impellers, turbine veins, wiper motor-related parts, distributors, starter switches, starter relays, wire harnesses for transmissions, window washer nozzles, air conditioner panel switch boards, coils for fuel-related electromagnetic valves, fuse connectors, horn terminals, insulators for electric parts, step motor rolls, lamp sockets, lamp reflectors, lamp housings, brake pistons, solenoid bobbins, engine oil filters, ignition system cases, etc.; and other various moldings. The liquid-crystalline resin composition of the invention has a high modulus of elasticity, and is therefore useful for producing precision moldings, especially those for damping parts. In particular, the composition is effectively used for producing optical pickup parts of optical driving devices, such as CD (compact disc), CD-ROM, DVD, MO and PD, since these parts are required to have good damping characteristics.

Now, the invention is described in more detail with reference to the following Examples, which, however, are not intended to restrict the scope of the invention.

REFERENCE EXAMPLE 1 (A-1)

995 parts by weight of p-hydroxybenzoic acid, 126 parts by weight of 4,4'-dihydroxybiphenyl, 112 parts by weight of terephthalic acid, 216 parts by weight of polyethylene terephthalate having an intrinsic viscosity of about 0.6 dl/g, and 960 parts by weight of acetic anhydride were fed into a reactor equipped with a stirrer and a condenser, and polymerized therein. Thus was produced a liquid-crystalline resin having a liquid crystal phase conversion point of 293° C., a logarithmic viscosity of 1.49 dl/g and a weight-average molecular weight of about 21,000.

REFERENCE EXAMPLE 2 (A-2)

907 parts by weight of p-hydroxybenzoic acid, 117 parts by weight of 4,4'-dihydroxybiphenyl, 30 parts by weight of hydroquinone, 150 parts by weight of terephthalic acid, 294 parts by weight of polyethylene terephthalate having an intrinsic viscosity of about 0.6 dl/g, and 940 parts by weight of acetic anhydride were fed into a reactor equipped with a stirrer and a condenser, and polymerized therein. Thus was produced a liquid-crystalline resin having a liquid crystal phase conversion point of 291° C., a logarithmic viscosity of 1.28 dl/g and a weight-average molecular weight of about 18,000.

REFERENCE EXAMPLE 3 (A-3)

870 parts by weight of p-hydroxybenzoic acid, 251 parts by weight of 4,4'-dihydroxybiphenyl, 149 parts by weight of hydroquinone, 195 parts by weight of 2,6-naphthalenedicarboxylic acid, 299 parts by weight of terephthalic acid, and 1314 parts by weight of acetic anhydride were fed into a reactor equipped with a stirrer and a condenser, and polymerized therein. Thus was produced a liquid-crystalline resin having a liquid crystal phase conversion point of 317° C., a logarithmic viscosity of 6.12 dl/g and a weight-average molecular weight of about 30,000.

REFERENCE EXAMPLE 4 (A-4)

In accordance with the disclosure in Japanese Patent Application Laid-Open No. 54-77691, 1265 parts by weight of p-acetoxybenzoic acid and 456 parts by weight of 6-acetoxy-2-naphthoic acid were poly-condensed in a reactor equipped with a condenser. Thus was produced a liquid-crystalline resin having a liquid crystal phase conversion point of 293-C, a logarithmic viscosity of 5.24 dl/g and a weight-average molecular weight of about 35,000.

The value of D90/D10 of aluminium borate whiskers (B) used herein is shown below.

The grain size distribution of aluminium borate whiskers (B) was obtained, using a laser diffraction/scattering-type grain size analyzer, LA-700 (manufactured by Horiba Seisaku-sho Co.). The sample to be analyzed was dispersed in a dispersion medium, pure water, using an ultrasonic bath, and the resulting dispersion was controlled to have a transmittance of about 80%. The cumulative grain size distribution data obtained were analyzed by volume.

To determine the grain size distribution of the aluminium borate whiskers (B) existing in resin compositions (resin pellets) and in moldings, the compositions (resin pellets) or the moldings were heated in an electric furnace at 550-C to remove the resin component, and the resulting residues were analyzed.

B-1 is a sample of commercially-available aluminium borate whiskers (trade name:Alborex, manufactured by Shikoku Chemical Co.—this has a chemical composition of $9Al_2O_3 \cdot 2B_2O_3$, a fiber diameter of from 0.5 to 1.0 μm, and a fiber length of from 10 to 30 μm); and B-2 to B-7 are samples as obtained by classifying the commercial product.

B-1: D90/D10=5.8 (D90=10.5, D10=1.8)

B-2: D90/D10=8.1 (D90=13.0, D10=1.6)

B-3: D90/D10=9.5 (D90=9.5, D10=1.0)

B-4: D90/D10=12.6 (D90=17.6, D10=1.4)

B-5: D90/D10=17.0 (D90=17.0, D10=1.0)

B-6: D90/D10=25.0 (D90=20.0, D10=0.8)

B-7: D90/D10=3.0 (D90=7.5, D10=2.5)

The organic bromine compound used herein is a polystyrene bromide copolymer (having a bromide content of 59% and a weight-average molecular weight of $30 \times 10^4$) as prepared by polymerizing a monomer mixture comprised of 80% by weight of dibromostyrene, 15% by weight of monobromostyrene and 5% by weight of tribromostyrene.

EXAMPLES 1 to 10, and COMPARATIVE EXAMPLES 1 to 6

100 parts by weight of the liquid-crystalline resin (A) as prepared in Reference Examples was kneaded in melt with the aluminium borate whiskers (B) as in Table 2 below, in a double-screw extruder (30 mmφ, L/D=45) under a different condition at 290 to 330° C. to prepare resin pellets. Briefly, the liquid-crystalline resin (A) was fed into the double-screw extruder through the main hopper, and the aluminium borate whiskers (B) were fed thereinto through a side feeder so that they might be blended with the melt of the resin (A). After having been dried in hot air, those pellets were fed into an injection-molding machine, Sumitomo Nestal Promat 40/25 (manufactured by Sumitomo Ship Building and Machinery Co.), in which they were molded into test pieces at a cylinder temperature of from 290 to 350° C. and at a mold temperature of 90° C. These test pieces were tested for their properties, in accordance with the methods mentioned below.

(1) Bending Characteristics:

Using the molding machine mentioned above, produced were test pieces having a thickness of 3.2 mm, a width of 12.7 mm and a length of 127 mm. In accordance with ASTM D790, 10 test pieces were tested for the bending strength and the bending elasticity to obtain the minimum value, the maximum value, the difference between the maximum value and the minimum value, and the average value.

(2) Surface Smoothness:

According to JIS B0651, the ten-point mean roughness (Rz) of each test piece as prepared in the same manner as in (1) was obtained, which indicates the surface smoothness of the sample.

(3) Fluidity in forming thin moldings:

Using the same molding machine as above, the resin composition sample was injection-molded at a cylinder temperature of higher than the melting point of the sample by 10° C., a mold temperature of 120° C., an injection flow rate of 99%, and an injection pressure of 500 kgf/cm², through a pin gate of 0.5 mm (thickness)×12.7 mm (width)× 1.0 mmφ, whereupon the length of the flowing rod of the sample as passed through the pin gate was measured.

The data obtained are shown in Table 1 below.

TABLE 1

| | Liquid-crystalline Resin (A) | Aluminium Borate Whiskers (B) | | D90/D10 | | |
|---|---|---|---|---|---|---|
| | | | Amount Added | | | |
| | Compound | Compound | (wt. pts.) | Before Kneaded | Pellets | Moldings |
| Example 1 | A-1 | B-2 | 54 | 8.1 | 7.3 | 6.3 |
| Example 2 | A-1 | B-3 | 54 | 9.5 | 8.7 | 7.5 |
| Example 3 | A-1 | B-4 | 54 | 12.6 | 10.7 | 9.9 |
| Example 4 | A-1 | B-5 | 54 | 17.0 | 15.3 | 13.0 |
| Comparative Example 1 | A-1 | B-1 | 54 | 5.8 | 4.8 | 4.1 |
| Comparative Example 2 | A-1 | B-6 | 54 | 25.0 | 22.5 | 20.5 |
| Comparative Example 3 | A-1 | B-7 | 54 | 3.0 | 2.7 | 2.7 |
| Example 5 | A-2 | B-4 | 54 | 12.6 | 10.5 | 9.6 |
| Example 6 | A-3 | B-4 | 54 | 12.6 | 10.3 | 9.3 |
| Example 7 | A-4 | B-4 | 54 | 12.6 | 10.2 | 9.1 |
| Comparative Example 4 | A-2 | B-1 | 54 | 5.8 | 4.5 | 4.0 |
| Comparative Example 5 | A-3 | B-1 | 54 | 5.8 | 4.3 | 3.8 |
| Comparative Example 6 | A-4 | B-1 | 54 | 5.8 | 4.4 | 3.8 |

TABLE 1-continued

| | | | | | | |
|---|---|---|---|---|---|---|
| Example 8 | A-1 | B-4 | 11 | 12.6 | 11.4 | 10.5 |
| Example 9 | A-1 | B-4 | 25 | 12.6 | 11.1 | 10.0 |
| Example 10 | A-1 | B-4 | 100 | 12.6 | 10.2 | 9.2 |
| Example 11 | A-1 | B-4* | 54 | 12.6 | 10.9 | 10.3 |

*Treated with aminosilane coupling agent.

| | Bending Strength (MPa) | | | | Modulus of Bending Elasticity (GPa) | | | | Surface Smoothness | Length of Flowing Rod |
|---|---|---|---|---|---|---|---|---|---|---|
| | Max. | Min. | (Max.-Min.) | Average | Max. | Min. | (Max.-Min.) | Average | Rz (μm) | (mm) |
| Example 1 | 218 | 200 | 18 | 208 | 22.0 | 21.5 | 0.5 | 21.7 | 2.1 | 95 |
| Example 2 | 220 | 195 | 25 | 202 | 21.0 | 20.1 | 0.9 | 20.4 | 1.7 | 97 |
| Example 3 | 228 | 220 | 8 | 224 | 22.8 | 22.5 | 0.3 | 22.7 | 2.3 | 95 |
| Example 4 | 230 | 187 | 43 | 196 | 20.3 | 19.0 | 1.3 | 19.5 | 2.9 | 92 |
| Comp. Example 1 | 231 | 107 | 124 | 188 | 18.9 | 16.3 | 2.6 | 17.5 | 7.3 | 75 |
| Comp. Example 2 | 183 | 85 | 98 | 153 | 18.2 | 14.1 | 4.1 | 16.5 | 2.2 | 89 |
| Comp. Example 3 | 164 | 98 | 66 | 137 | 23.4 | 14.6 | 8.8 | 19.1 | 1.5 | 87 |
| Example 5 | 212 | 195 | 17 | 203 | 20.8 | 19.5 | 1.3 | 20.3 | 2.7 | 87 |
| Example 6 | 194 | 180 | 14 | 187 | 20.1 | 19.0 | 1.1 | 19.5 | 2.8 | 68 |
| Example 7 | 247 | 215 | 32 | 241 | 20.9 | 19.3 | 1.5 | 20.1 | 2.8 | 75 |
| Comp. Example 4 | 215 | 95 | 120 | 185 | 16.7 | 14.0 | 1.7 | 15.5 | 6.5 | 70 |
| Comp. Example 5 | 196 | 107 | 89 | 153 | 15.5 | 13.5 | 2.0 | 14.7 | 7.0 | 43 |
| Comp. Example 6 | 245 | 123 | 122 | 195 | 16.0 | 14.2 | 1.8 | 15.2 | 6.9 | 57 |
| Example 8 | 180 | 168 | 12 | 172 | 14.2 | 13.7 | 0.5 | 14.0 | 0.9 | 117 |
| Example 9 | 191 | 180 | 11 | 185 | 17.5 | 17.0 | 0.5 | 17.3 | 1.2 | 105 |
| Example 10 | 170 | 154 | 16 | 160 | 25.5 | 24.6 | 0.9 | 25.1 | 2.7 | 87 |
| Example 11 | 233 | 227 | 6 | 230 | 23.0 | 22.8 | 0.2 | 22.9 | 2.3 | 96 |

The data in Table 1 above verify that only the specific liquid-crystalline resin compositions comprising the liquid-crystalline resin (A) and the aluminum borate whiskers (B) having the specific D90/D10 can be molded into moldings having a high bending strength and a high modulus of bending elasticity, of which the mechanical data are stable and fluctuate little, and having good surface smoothness, and verify that only those have good fluidity in forming thin moldings.

EXAMPLE 11

A liquid-crystalline resin and its pellets were produced in the same manner as in Example 3, except that the aluminium borate whiskers (B-4) were pre-treated at their surface with an aminosilane coupling agent (γ-aminopropyltriethoxysilane).

EXAMPLE 12

A liquid-crystalline resin composition and its pellets were produced in the same manner as in Example 3, except that the organic bromine compound, FR-1 was added to the composition. The amount of FR-1 added relative to 100 parts by weight of the composition is shown in Table 2 below. Briefly, in this, FR-1 was fed into the double-screw extruder along with the liquid-crystalline resin through the main hopper. The resin pellets prepared herein were fed into an injection-molding machine, Sumitomo Nestal Promat 40/25 (manufactured by Sumitomo Ship Building and Machinery Co.), in which they were molded into test pieces (size: 0.5 mm (thickness)×12.7 mm×127 mm) at a cylinder temperature of higher than the melting point of the pellets by 10° C. and at a mold temperature of 90° C. These test pieces were tested for their properties in the same manner as in Example 1. In addition, these test pieces prepared herein and the test pieces of Example 3 were tested for the flame resistance in accordance with the vertical combustion test as stated in UL 94 Standard.

The data obtained are shown in Table 2 below.

TABLE 2

| | Liquid-crystalline Resin (A) | Aluminium Borate Whiskers (B) | | Organic Bromine Compound | | D90/D10 | | |
|---|---|---|---|---|---|---|---|---|
| | | | Amount Added | | Amount Added | | | |
| | Compound | Compound | (wt. pts.) | Compound | (wt. pts.) | Before Kneaded | Pellets | Moldings |
| Example 12 | A-1 | B-4 | 54 | FR-1 | 10 | 12.6 | 10.5 | 9.7 |
| Example 3 | A-1 | B-4 | 54 | — | — | 12.6 | 10.7 | 9.9 |

| | Surface Smooth- | Length of Flowing | Flame |

TABLE 2-continued

|  | Bending Strength (MPa) | | | | Modulus of Bending Elasticity (GPa) | | | | ness Rz ($\mu$m) | Rod (mm) | Resistance UL-94 |
|---|---|---|---|---|---|---|---|---|---|---|---|
|  | Max. | Min. | (Max.-Min.) | Average | Max. | Min. | (Max.-Min.) | Average |  |  |  |
| Example 12 | 227 | 220 | 7 | 224 | 22.5 | 22.3 | 0.2 | 22.4 | 2.2 | 98 | V-0 |
| Example 3 | 228 | 220 | 8 | 224 | 22.8 | 22.5 | 0.3 | 22.7 | 2.3 | 95 | V-2 |

The organic bromine compound added to the composition made the composition resistant to flames without interfering with the fluidity of the composition and the bending characteristics and the surface smoothness of the moldings of the composition.

EXAMPLES 13 to 17

Liquid-crystalline compositions and their pellets were produced in the same manner as in Example 3, except that the olefinic polymer shown in Table 3 below was added to the compositions. The amount of the polymer added relative to 100 parts by weight of the composition is shown in Table 3. Briefly, the olefinic polymer was fed into the double-screw extruder along with the liquid-crystalline resin through the main hopper. The resin pellets prepared herein were fed into an injection-molding machine, Toshiba IS55EPN (manufactured by Toshiba Machine Plastic Engineering Co.), in which they were molded into box-type test pieces (size: 8 mm (width)×10 mm (height)×100 mm (length)×1 mm (thickness)) at a cylinder temperature of higher than the melting point of the pellets by 10° C. and at a mold temperature of 90° C. The test pieces each had four partition of 0.8 mm thick at regular intervals. The force needed for releasing the test piece from the mold was measured, which indicates the mold releasability of the sample. In addition, the outward appearance of each test piece was visually observed to check the presence of absence of any gas-burnt spots on its surface.

The data obtained are shown in Table 3.

TABLE 3

|  | Liquid-crystalline Resin (A) Compound | Aluminium Borate Whiskers (B) | | Olefinic Polymer | | | D90/D10 | | |
|---|---|---|---|---|---|---|---|---|---|
|  |  | Compound | Amount Added (wt. pts.) | Compound | Weight-average Molecular Weight | Amount Added (wt. pts.) | Before Kneaded | Pellets | Moldings |
| Example 13 | A-1 | B-4 | 54 | PE | 400,000 | 0.4 | 12.6 | 10.8 | 9.8 |
| Example 14 | A-1 | B-4 | 54 | PP | 150,000 | 0.4 | 12.6 | 10.5 | 9.5 |
| Example 15 | A-1 | B-4 | 54 | PE/P | 100,000 | 0.4 | 12.6 | 10.7 | 9.7 |
| Example 16 | A-1 | B-4 | 54 | PE/B1 | 110,000 | 0.4 | 12.6 | 10.4 | 9.5 |
| Example 17 | A-1 | B-4 | 54 | PE/P/HD | 80,000 | 0.4 | 12.6 | 10.5 | 9.6 |
| Example 3 | A-1 | B-4 | 54 | — | — | — | 12.6 | 10.7 | 9.9 |

|  | Bending Strength (MPa) | | | | Modulus of Bending Elasticity (GPa) | | | | Surface Smoothness Rz ($\mu$m) | Length of Flowing Rod (mm) | Mold releasability Force for mold release (kg) | Gas-burnt Spots |
|---|---|---|---|---|---|---|---|---|---|---|---|---|
|  | Max. | Min. | (Max.-Min.) | Average | Max. | Min. | (Max.-Min.) | Average |  |  |  |  |
| Example 13 | 228 | 219 | 9 | 224 | 22.8 | 22.6 | 0.2 | 22.7 | 2.0 | 96 | 30 | No |
| Example 14 | 226 | 217 | 9 | 222 | 22.8 | 22.6 | 0.2 | 22.7 | 2.1 | 95 | 39 | No |
| Example 15 | 227 | 218 | 9 | 222 | 22.7 | 22.5 | 0.2 | 22.6 | 2.2 | 94 | 40 | No |
| Example 16 | 225 | 214 | 11 | 221 | 22.7 | 22.5 | 0.2 | 22.6 | 2.1 | 94 | 42 | No |
| Example 17 | 225 | 215 | 10 | 221 | 22.7 | 22.4 | 0.3 | 22.6 | 2.1 | 94 | 45 | No |
| Example 3 | 228 | 220 | 8 | 224 | 22.8 | 22.5 | 0.3 | 22.7 | 2.3 | 94 | 145 | No |

PE: polyethylene, PP: polypropylene, PE/P: ethylene/propylene copolymer, PE/B1: ethylene/butene-1 copolymer, PE/P/HD: ethylene/propylene/1,4-hexadiene copolymer As in Table 3 above, the olefinic polymer added to the composition improved the mold releasability of the moldings of the composition without interfering with the mechanical properties of the composition and its moldings and without interfering with the surface smoothness of the moldings.

EXAMPLE 18

A liquid-crystalline composition and its pellets were produced in the same manner as in Example 12, except that the olefinic polymer shown in Table 4 below was added to the composition. The amount of the polymer added relative to 100 parts by weight of the composition is shown in Table 4.

Briefly, the olefinic polymer was fed into the double-screw extruder along with the liquid-crystalline resin through the main hopper. The resin pellets prepared herein were fed into an injection-molding machine, Toshiba IS55EPN (manufactured by Toshiba Machine Plastic Engineering Co.), in which they were molded into box-type test pieces (size: 8 mm (width)×10 mm (height)×100 mm (length)×1 mm (thickness)) at a cylinder temperature of higher than the melting point of the pellets by 10° C. and at a mold temperature of 90° C. The test pieces each had four partition of 0.8 mm thick at regular intervals. The force needed for releasing the test piece from the mold was measured, which indicates the mold releasability of the sample. In addition, the outward appearance of each test piece was visually observed to check the presence of absence of any gas-burnt spots on its surface.

Further, the resin pellets prepared herein were fed into an injection-molding machine, Sumitomo Nestal Promat 40/25 (manufactured by Sumitomo Ship Building and Machinery Co.), in which they were molded into test pieces (size: 0.5 mm (thickness)×12.7 mm×127 mm) at a cylinder temperature of higher than the melting point of the pellets by 10° C. and at a mold temperature of 90° C. These test pieces were tested for the flame resistance in accordance with the vertical combustion test as stated in UL 94 Standard.

The data obtained are shown in Table 4.

TABLE 4

| | Liquid-crystalline Resin (A) Compound | Aluminium Borate Whiskers (B) | | Organic Bromine Compound | | Olefinic Polymer | | | D90/D10 | | |
|---|---|---|---|---|---|---|---|---|---|---|---|
| | | Compound | Amount Added (wt. pts.) | Compound | Amount Added (wt. pts.) | Compound | Weight-average Molecular Weight | Amount Added (wt. pts.) | Before Kneaded | Pellets | Moldings |
| Example 18 | A-1 | B-4 | 54 | FR-1 | 10 | PE | 400,000 | 0.4 | 12.6 | 10.6 | 9.8 |
| Example 12 | A-1 | B-4 | 54 | FR-1 | 10 | — | — | — | 12.6 | 10.5 | 9.7 |

PE: polyethylene

| | Bending Strength (MPa) | | | | Modulus of Bending Elasticity (GPa) | | | | Surface Smoothness Rz (μm) | Length of Flowing Rod (mm) | Mold Releasability Force for mold release (kg) | Gas-burnt Spots | Flame Resistance UL-94 |
|---|---|---|---|---|---|---|---|---|---|---|---|---|---|
| | Max. | Min. | (Max.-Min.) | Average | Max. | Min. | (Max.-Min.) | Average | | | | | |
| Example 18 | 228 | 220 | 8 | 224 | 22.6 | 22.4 | 0.2 | 22.5 | 2.0 | 99 | 30 | No | V-0 |
| Example 12 | 227 | 220 | 7 | 224 | 22.5 | 22.3 | 0.2 | 22.4 | 2.2 | 98 | 125 | No | V-0 |

While the invention has been described in detail and with reference to specific embodiments thereof, it will be apparent to one skilled in the art that various changes and modifications can be made therein without departing from the spirit and scope thereof.

What is claimed is:

1. A liquid-crystalline resin composition comprising (A) 100 parts by weight of a liquid-crystalline resin and (B) from 1 to 300 parts by weight of aluminum borate whiskers of which the grain size distribution as obtained through laser diffractometry satisfies the following requirement:

$7.5 \leq D90/D10 \leq 20$;

wherein D90 (μm) indicates the grain size at a relative grain content of 90%, and D10 (μm) indicates the grain size at a relative grain content of 10%.

2. A liquid-crystalline resin composition comprising (A) 100 parts by weight of a liquid-crystalline resin and (B) from 1 to 300 parts by weight of aluminium borate whiskers, in which the grain size distribution as obtained through laser diffractometry of the aluminium borate whiskers existing therein satisfies the following requirement:

$5 \leq D90/D10 \leq 20$ wherein D90 (μm) indicates the grain size at a relative grain content of 90%, and D10 (μm) indicates the grain size at a relative grain content of 10%.

3. The liquid-crystalline resin composition as claimed in claim 1 or 2, in which the liquid-crystalline resin (A) comprises at least one member selected from the group consisting of a liquid-crystalline polyester and a liquid-crystalline polyesteramide.

4. The liquid-crystalline resin composition as claimed in any one of claims 1 to 3, in which the liquid-crystalline resin (A) indispensably has ethylene dioxide units.

5. The liquid-crystalline resin composition as claimed in claim 1, in which the liquid-crystalline resin (A) comprises a liquid-crystalline polyester comprising at least units (I), (III) and (IV) of the following constitutional units (I), (II), (III) and (IV):

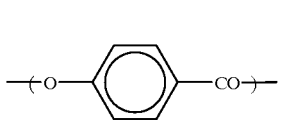

(I)

(II)

(III)

(IV)

wherein $R_1$ represents at least one group selected from

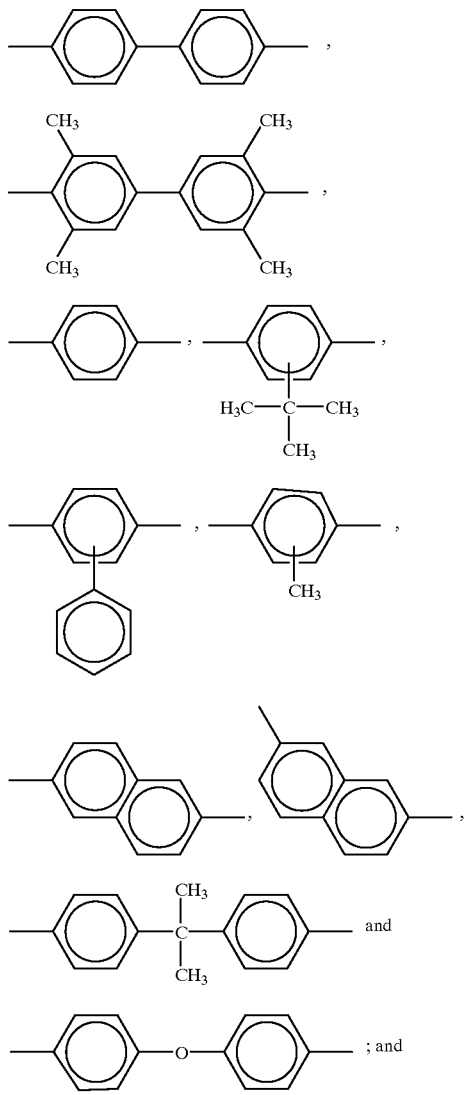

$R_2$ represents at least one group selected from

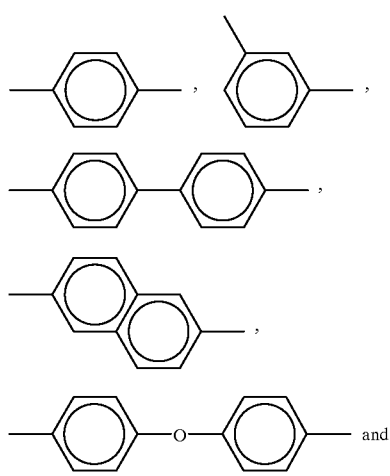

-continued

OCH₂CH₂O structure with X substituents;

in which x represents a hydrogen atom or a chlorine atom.

6. The liquid-crystalline resin composition as claimed in claim 1, in which the grain size distribution of the aluminium borate whiskers (B) as obtained through laser diffractometry satisfies the following requirement:

$$8 \leq D90/D10 \leq 14.$$

7. The liquid-crystalline resin composition as claimed in claim 1, in which the grain size distribution of the aluminium borate whiskers (B) as obtained through laser diffractometry satisfies the following requirement:

$$1.0 \ \mu m < D10 \leq 2.0 \ \mu m.$$

8. The liquid-crystalline resin composition as claimed in claim 1, in which the grain size distribution of the aluminium borate whiskers (B) as obtained through laser diffractometry satisfies the following requirement:

$$8.0 \ \mu m < D90 \leq 18 \ \mu m.$$

9. The liquid-crystalline resin composition as claimed in claim 1, which additionally contains from 0.5 to 60 parts by weight of an organic bromine compound relative to 100 parts by weight of the liquid-crystalline resin (A).

10. The liquid-crystalline resin composition as claimed in claim 9, in which the organic bromine compound is a polystyrene bromide as produced from a styrene bromide monomer to consist essentially of one or more of the following constitutional units and have a weight-average molecular weight of from $1 \times 10^3$ to $120 \times 10^4$.

—(CH₂CH)— —(CH₂CH)—
with Br₂ and Br₃ substituted phenyl groups

11. The liquid-crystalline resin composition as claimed in claim 1, which additionally comprises from 0.01 to 10 parts by weight of one or more olefinic polymers selected from polyethylene, polypropylene, copolymers of at least one of ethylene and propylene with α-olefins having 4 or more carbon atoms, and copolymers of at least one of ethylene and propylene with α-olefins having 4 or more carbon atoms and non-conjugated dienes, relative to 100 parts by weight of the liquid-crystalline resin (A).

12. A method for producing the liquid-crystalline resin composition of claim 1, which comprises adding, to a melt of a liquid-crystalline resin (A), aluminium borate whiskers (B) of which the grain size distribution as obtained through laser diffractometry satisfies the following requirement:

$$7.5 \leq D90/D10 \leq 20$$

wherein D90 ($\mu$m) indicates the grain size at a relative grain content of 90%, and D10 ($\mu$m) indicates the grain size at a relative grain content of 10%.

13. A molding of a liquid-crystalline resin composition comprising (A) 100 parts by weight of a liquid-crystalline resin and (B) from 1 to 300 parts by weight of aluminium borate whiskers, in which the grain size distribution as obtained through laser diffractometry of the aluminium borate whiskers existing therein satisfies the following requirement:

$$5 \leq D90/D10 \leq 20$$

wherein D90 ($\mu$m) indicates the grain size at a relative grain content of 90%, and D10 ($\mu$m) indicates the grain size at a relative grain content of 10%.

14. A precision molding as produced by molding the liquid-crystalline resin composition of claim 2.

15. The molding as claimed in claim 13, which is a precision molding.

16. A damping part formed from the precision molding as claimed in claim 14 or 15.

17. An optical pickup part as produced by molding the liquid-crystalline resin composition of claim 1.

18. The liquid-crystalline resin composition as claimed in claim 5, wherein said liquid-crystalline resin (A) comprises a liquid-crystalline polyester comprising said constitutional units (I), (II), (III) and (IV).

19. The liquid-crystalline resin as claimed in claim 1, further comprising an average bending strength of at least about 172 MPa.

20. The liquid-crystalline resin as claimed in claim 1, further comprising an average modulus of bending elasticity of about 14.0 GPa.

* * * * *